(12) United States Patent
Tzen et al.

(10) Patent No.: US 10,990,423 B2
(45) Date of Patent: Apr. 27, 2021

(54) PERFORMANCE OPTIMIZATIONS FOR EMULATORS

(71) Applicant: Microsoft Technology Licensing, LLC, Redmond, WA (US)

(72) Inventors: Ten H. Tzen, Sammamish, WA (US); Arun U. Kishan, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 50 days.

(21) Appl. No.: 16/403,158

(22) Filed: May 3, 2019

(65) Prior Publication Data

US 2019/0265993 A1 Aug. 29, 2019

Related U.S. Application Data

(63) Continuation of application No. 14/873,100, filed on Oct. 1, 2015, now Pat. No. 10,303,498.

(51) Int. Cl.
*G06F 9/455* (2018.01)

(52) U.S. Cl.
CPC ............ *G06F 9/455* (2013.01); *G06F 9/4552* (2013.01); *G06F 9/45516* (2013.01)

(58) Field of Classification Search
CPC ..... G06F 9/455; G06F 9/45516; G06F 9/4552
See application file for complete search history.

(56) References Cited

U.S. PATENT DOCUMENTS

| | | | |
|---|---|---|---|
| 4,969,204 A | 11/1990 | Jones et al. | |
| 5,050,230 A | 9/1991 | Jones et al. | |
| 5,122,873 A | 6/1992 | Golin | |
| 5,223,701 A | 6/1993 | Chandler et al. | |
| 5,301,037 A | 4/1994 | Kang et al. | |
| 5,502,576 A | 3/1996 | Ramsay et al. | |
| 6,353,483 B1 | 3/2002 | Laverty et al. | |
| 6,442,752 B1 | 8/2002 | Jennings et al. | |

(Continued)

OTHER PUBLICATIONS

Kim et al. "An Efficient Mixed-mode Execution Enivornment for C on Mobile Phone Platforms" 2008, IEEE, 2009 World Congress on Computer Science and Information Engineering, pp. 320-328. (Year: 2008).*

(Continued)

*Primary Examiner* — Eunhee Kim
(74) *Attorney, Agent, or Firm* — Workman Nydegger

(57) ABSTRACT

One embodiment illustrated herein includes a method that may be practiced in a computing environment with a guest architecture running a native architecture system. The method includes acts for handling function calls. The method includes receiving a call to a hybrid binary, wherein the call is in a format for the guest architecture. The hybrid binary includes a native function compiled into a native architecture binary code using guest architecture source code, an interoperability thunk to handle an incompatibility between the guest architecture and the native architecture, and native host remapping metadata that is usable by an emulator to redirect native host callable targets to the interoperability thunk. The method further includes invoking the interoperability thunk to allow the native function in the hybrid binary to be executed natively on the native architecture system.

20 Claims, 8 Drawing Sheets

(56) References Cited

U.S. PATENT DOCUMENTS

| | | |
|---|---|---|
| 6,507,674 B1 | 1/2003 | Yagishita et al. |
| 6,641,051 B1 | 11/2003 | Illowsky et al. |
| 6,725,779 B2 | 4/2004 | Van et al. |
| 6,731,800 B1 | 5/2004 | Barthel et al. |
| 6,880,122 B1 | 4/2005 | Lee et al. |
| 6,920,810 B1 | 7/2005 | Lawton et al. |
| 6,941,024 B2 | 9/2005 | Mukherjee |
| 7,062,087 B1 | 6/2006 | Varga |
| 7,088,866 B2 | 8/2006 | Andrew |
| 7,110,596 B2 | 9/2006 | Simard et al. |
| 7,116,834 B2 | 10/2006 | Malvar |
| 7,120,297 B2 | 10/2006 | Simard et al. |
| 7,148,907 B2 | 12/2006 | Smith et al. |
| 7,319,543 B2 | 1/2008 | Suzuki |
| 7,321,688 B2 | 1/2008 | Fujiwara |
| 7,512,274 B2 | 3/2009 | Simard et al. |
| 7,613,363 B2 | 11/2009 | Platt et al. |
| 7,737,993 B2 | 6/2010 | Kaasila et al. |
| 8,391,638 B2 | 3/2013 | Sykes |
| 2002/0061140 A1 | 5/2002 | Kajiwara |
| 2002/0089549 A1 | 7/2002 | Munro et al. |
| 2002/0099884 A1 | 7/2002 | Chang et al. |
| 2002/0108521 A1 | 8/2002 | Velde et al. |
| 2004/0015972 A1 | 1/2004 | Barclay |
| 2004/0088685 A1 | 5/2004 | Poznanovic et al. |
| 2004/0096102 A1 | 5/2004 | Handley |
| 2004/0151376 A1 | 8/2004 | Nomura et al. |
| 2004/0151401 A1 | 8/2004 | Sawhney et al. |
| 2005/0275897 A1 | 12/2005 | Fan et al. |
| 2005/0286752 A1 | 12/2005 | Takiguchi |
| 2005/0286776 A1 | 12/2005 | Bai et al. |
| 2006/0001690 A1 | 1/2006 | Martinez et al. |
| 2006/0062454 A1 | 3/2006 | Fan et al. |
| 2007/0094075 A1 | 4/2007 | Graham et al. |
| 2007/0103731 A1 | 5/2007 | Tse et al. |
| 2007/0229894 A1 | 10/2007 | Siemens et al. |
| 2007/0292049 A1 | 12/2007 | Liu et al. |
| 2008/0159427 A1 | 7/2008 | Kang et al. |
| 2008/0292130 A1 | 11/2008 | Nafarieh et al. |
| 2009/0100416 A1 | 4/2009 | Brown et al. |
| 2009/0304303 A1 | 12/2009 | Sykes |
| 2012/0233593 A1 | 9/2012 | Sahoo et al. |
| 2013/0096908 A1 | 4/2013 | Cook et al. |
| 2013/0141436 A1 | 6/2013 | Sykes |
| 2013/0283245 A1* | 10/2013 | Black .................. G06F 9/44589 717/130 |
| 2015/0180858 A1 | 6/2015 | Shanmugam et al. |
| 2015/0301848 A1* | 10/2015 | Roehrig ................ G06F 9/4856 718/1 |
| 2015/0347108 A1* | 12/2015 | Munshi .................... G06F 8/54 717/146 |
| 2020/0057994 A1 | 2/2020 | Hunn |

OTHER PUBLICATIONS

Shen et al. "A Retargetable Static Binary Translator for the ARM Architecture". ACM Transactions on Architecture and Code Optimization, vol. 11, No. 2, Article 18, Publication date: Jun. 2014. 25 Pages. (Year: 2014).*

"Extended European Search Report Issued in European Patent Application No. 19210044.4", dated Mar. 17, 2020, 9 Pages.

"Get Yourself Noticed with a Favicon", Retrieved from: http://web.archive.org/web/20080725091442/http://www.fontstuff.com/frontpage/fptut16.htm, Jul. 25, 2008, 4 Pages.

"Final Office Action Issued in U.S. Appl. No. 12/133,358", dated Feb. 2, 2012, 15 Pages.

"Non Final Office Action Issued in U.S. Appl. No. 12/133,358", dated Aug. 31, 2011, 14 Pages.

"Final Office Action Issued in U.S. Appl. No. 13/753,427", dated Sep. 11, 2013, 11 Pages.

"Final Office Action Issued in U.S. Appl. No. 13/753,427", dated Jul. 21, 2014, 12 Pages.

"Non Final Office Action Issued in U.S. Appl. No. 13/753,427", dated Feb. 21, 2014, 11 Pages.

"Non Final Office Action Issued in U.S. Appl. No. 13/753,427", dated Apr. 24, 2013, 9 Pages.

"Notice of Allowance Issued in U.S. Appl. No. 13/753,427", dated Dec. 29, 2014, 7 Pages.

"Notice of Allowance Issued in U.S. Appl. No. 17/008,346", dated Feb. 24, 2021, 12 Pages.

Dhoot, Anubhav Vijay, "Hybrid Online/Offline Optimization of Application Binaries", A Thesis submitted to the Graduate Faculty of North Carolina State University in partial satisfaction of the requirements for the Degree of Master of Science in Computer Science, Department of Computer Science, Jul. 8, 2004, 53 Pages.

Roy, et al., "Hybrid Binary Rewriting for Memory Access Instrumentation", In Proceedings of the 7th ACM SIGPLAN/SIGOPS International Conference on Virtual Executation Environments, Mar. 9, 2011, 227-238.

* cited by examiner

| Register | Volatile? | Role | X86 Register Mapping |
|---|---|---|---|
| r0 | Volatile | Parameter/Result/Scratch Register 1 | Emulator Scratch |
| r1 | Volatile | Parameter/Result/Scratch Register 2 | Emulator Scratch |
| r2 | Volatile | Parameter/Scratch Register 3 | Emulator Scratch |
| r3 | Volatile | Parameter/Scratch Register 4 | EIP |
| r4 | Non-Volatile | | EAX (Free for Fast Dispatch, Pop Thunk) |
| r5 | Non-Volatile | | ECX (Free for Fast Dispatch, Pop Thunk) |
| r6 | Non-Volatile | | EDX (Free for Fast Dispatch, Pop Thunk) |
| r7 | Non-Volatile | | EBX (Free for Fast Dispatch, Push Thunk) |
| r8 | Non-Volatile | | ESI |
| r9 | Non-Volatile | | EDI |
| r10 | Non-Volatile | | Reserved for Emulator Data (FS Base) |
| r11 | Non-Volatile | Frame Pointer | EBP |
| r12 | Volatile | Intra-Procedure-Call Scratch | Emulator Scratch (Free for Fast Dispatch) |
| r13/SP | Non-volatile | Stack Pointer | ESP |
| r14/LR | Non-Volatile | Link Register | Emulator Scratch |
| r15/PC | Non-Volatile | Program Counter | Program Counter |

*Figure 4A*

| Register | Volatile? | Role | X86 Register Mapping |
|---|---|---|---|
| D0 | Volatile | Parameter 1/Result Register | R7 |
| D1 | Volatile | Parameter 2 | R6 |
| D2 | Volatile | Parameter 3 | R5 |
| D3 | Volatile | Parameter 4 | R4 |
| D4 | Volatile | Parameter 5 | R3 |
| D5 | Volatile | Parameter 6 | R2 |
| D6 | Volatile | Parameter 7 | R1 |
| D7 | Volatile | Parameter 8 | R0 |
| D8 | Non-Volatile | | Emulator Scratch |
| D9 | Non-Volatile | | Emulator Scratch |
| D10 | Non-Volatile | | Emulator Scratch |
| D11 | Non-Volatile | | Emulator Scratch |
| D12 | Non-Volatile | | Emulator Scratch |
| D13 | Non-Volatile | | N/A (Maintains Host Value) |
| D14 | Non-Volatile | | N/A (Maintains Host Value) |
| D15 | Non-Volatile | | N/A (Maintains Host Value) |
| Q8 | Volatile | | XMM0 |
| Q9 | Volatile | | XMM1 |
| Q10 | Volatile | | XMM2 |
| Q11 | Volatile | | XMM3 |
| Q12 | Volatile | | XMM4 |
| Q13 | Volatile | | XMM5 |
| Q14 | Volatile | | XMM6 |
| Q15 | Volatile | | XMM7 |
| FPCR | Mixed | Floating Control Register; RMode is Nonvolatile. | X87 Control Word RC |

| Register | Volatile? | Role | X86 Register Mapping |
|---|---|---|---|
| x0 | Volatile | Parameter/Scratch Register 1, Result Register | ECX (Free for Fast Dispatch, Pop Thunk) |
| x1 | Volatile | Parameter/Scratch Register 2 | EDX (Free for Fast Dispatch, Pop Thunk) |
| x2-x7 | Volatile | Parameter/Scratch Register 3-8 | Emulator Scratch |
| x8 | Volatile | Scratch Register | EIP (Free for Fast Dispatch) |
| x9-x15 | Volatile | Scratch Register | Emulator Scratch (Free for Fast Dispatch) |
| x16-x17 | Volatile | Intra-Procedure-Call Scratch Registers | Emulator Scratch (Free for Fast Dispatch) |
| x18 | Non-Volatile | Platform Register: in Kernel Mode, Points to KPCR for the Current Processor; in User Mode, Points to TEB | N/A (maintains Native Value) |
| x19 | Non-Volatile | Scratch Register | ESI |
| x20 | Non-Volatile | Scratch Register | EDI |
| x21 | Non-Volatile | Scratch Register | EBX (Free for Fast Dispatch, Push Thunk) |
| x22-x25 | Non-Volatile | Scratch Register | N/A (Maintains Host Value) |
| x26 | Non-Volatile | Scratch Registers | Reserved for Emulator Data (FS Base) |
| x27 | Non-Volatile | Scratch Register | EAX (Free for Fast Dispatch, Pop Thunk) |
| x28 | Non-Volatile | Scratch Register | ESP[1] |
| x29/fp | Non-Volatile | Frame Pointer | EBP |
| x30/lr | Non-Volatile | Link Register | Emulator Scratch |
| SP | Non-Volatile | Stack Pointer | N/A (Maintains Native Value) |
| PC | Non-Volatile | Program Counter | N/A (Maintains Native Value) |

| Register | Volatile? | Role | X86 Register Mapping |
|---|---|---|---|
| V0 | Volatile | Parameter 1/Result Register | XMM0 |
| V1 | Volatile | Parameter 2 | XMM1 |
| V2 | Volatile | Parameter 3 | XMM2 |
| V3 | Volatile | Parameter 4 | XMM3 |
| V4 | Volatile | Parameter 5 | XMM4 |
| V5 | Volatile | Parameter 6 | XMM5 |
| V6 | Volatile | Parameter 7 | XMM6 |
| V7 | Volatile | Parameter 8 | XMM7 |
| D8 | Non-Volatile | | N/A (Maintains Native Value) |
| D9 | Non-Volatile | | N/A (Maintains Native Value) |
| D10 | Non-Volatile | | N/A (Maintains Native Value) |
| D11 | Non-Volatile | | N/A (Maintains Native Value) |
| D12 | Non-Volatile | | N/A (Maintains Native Value) |
| D13 | Non-Volatile | | N/A (Maintains Native Value) |
| D14 | Non-Volatile | | N/A (Maintains Native Value) |
| D15 | Non-Volatile | | N/A (Maintains Native Value) |
| D16 | Volatile | | Emulator Scratch |
| D17 | Volatile | | Emulator Scratch |
| D18 | Volatile | | Emulator Scratch |
| D19 | Volatile | | Emulator Scratch |
| D20 | Volatile | | Emulator Scratch |
| D21 | Volatile | | Emulator Scratch |
| D22 | Volatile | | Emulator Scratch |
| D23 | Volatile | | Emulator Scratch |
| D24 | Volatile | | R7 |
| D25 | Volatile | | R6 |
| D26 | Volatile | | R5 |
| D27 | Volatile | | R4 |
| D28 | Volatile | | R3 |
| D29 | Volatile | | R2 |
| D30 | Volatile | | R1 |
| D31 | Volatile | | R0 |
| FPCR | Mixed | Floating Control Register; RMode is Nonvolatile. | X87 Control Word RC |

*Figure 5B*

PERFORMANCE OPTIMIZATIONS FOR EMULATORS

CROSS-REFERENCE TO RELATED APPLICATIONS

This application is a continuation of U.S. patent application Ser. No. 14/873,100, filed Oct. 1, 2015, and entitled "PERFORMANCE OPTIMIZATIONS FOR EMULATORS," and which issued as U.S. Pat. No. 10,303,498 on May 28, 2019, the entire contents of which are incorporated by reference herein in their entirety.

BACKGROUND

Background and Relevant Art

Software emulation systems can be used to execute applications for one type of guest computer architecture on another type of native computer architecture. This is achieved using dynamic translation, a technique used to translate x86 instructions to corresponding ARM instructions at runtime. As one might expect, the translation process can introduce delays into the runtime execution of applications. This is particularly true when there are incompatibilities between the guest architecture and the native architecture.

For example, ARM processors have a much weaker memory model than x86. To achieve compatible memory ordering when emulating x86 applications on ARM, the runtime compiler is forced to aggressively generate memory barriers in the ARM code to accurately emulate the x86 strongly ordered semantic. The liberal use of memory barriers is prohibitively expensive. As a result, some emulators default to using a single processor whenever possible (thereby eliminating the need for barrier generation), but at the cost of giving up multi-core processing.

As yet another example, the guest architecture may use data types that are different than the native architecture. For example, the guest architecture may use 32-bit data types, while 64-bit data types are used by the native architecture. This can require additional data marshaling to be performed at runtime by the emulator in both directions. Thus, data will need to be marshalled from 32-bit data types to 64-bit data types and from 64-bit data types to 32-bit data types. It is difficult to automatically marshal data types without developer effort. For a large software project, this requires every engineer to annotate the data type appropriately and is not scalable.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment with a guest architecture running a native architecture system. The method includes acts for handling function calls. The method includes receiving a call to a target binary, wherein the call is in a format for the guest architecture. The method further includes determining that the call is to a binary that is a hybrid binary. The hybrid binary includes a native function compiled into a native architecture binary code using guest architecture source code and a specialized thunk to handle an incompatibility between the guest architecture and the native architecture. As a result of determining that the call in a format for the guest architecture to a binary that is a hybrid binary, the method further includes invoking the specialized thunk to allow the native function in the hybrid binary to be executed natively on the native architecture system.

Another embodiment includes a method that may be practiced in a computing environment. The method includes acts for creating a binary using guest source code for a guest architecture running on a native architecture system. The binary is configured to run natively on the native architecture system. The method includes accessing guest architecture source code. The method further includes compiling the guest source code to a hybrid binary. This includes creating a native function compiled into a native architecture binary code using guest architecture source code. This further includes creating a specialized thunk to handle an incompatibility between the guest architecture and the native architecture calling convention.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 4A illustrates register mapping;

FIG. 4B illustrates another example of register mapping;

FIG. 5A illustrates register mapping;

FIG. 5B illustrates another example of register mapping;

DETAILED DESCRIPTION

Some embodiments herein are able to implement an improved computing system by using hybrid binaries for guest applications implemented on a native host. A hybrid binary is a special native binary that has been compiled to facilitate interoperability with a guest architecture emulator. As such, embodiments can eliminate, for some code, runtime cross compilation. As such, higher performance machines can be implemented without needing costly hardware improvements. Thus, machines implementing this functionality are improved with respect to performance over previous machines with the same or similar hardware specifications when running guest architecture code on a different native architecture machine.

A hybrid binary is generated by the native tool chain with full awareness of the original source code. This allows for the full gamut of native code analysis and optimization to be applied to the code, including the appropriate use of native memory barrier instructions. For code that cannot be translated to native code by the tools, some object code remains in the binary (guest object code). This is still handled by the emulator as if no optimization had taken place at all. In contrast to approaches which attempt to marshal between guest and native code (thereby eliminating the need for special "guest" binaries altogether), this solution continues to leverage the original guest architecture source code, obviating the need for custom data structure or more intricate marshalling. Embodiments can maintain full compatibility with the original guest source code and moves responsibility for calling convention marshalling to the tool chain. Embodiments can be applied to native host architectures that may have a different "bitness" than the guest. For example, 32-bit x86 guest code could be implemented on native 64-bit ARM64 hardware by generating ILP32 code (i.e., 64-bit code that uses 32-bit pointers).

By reducing the amount of work to be performed by systems of a native host architecture implementing a guest architecture, these systems can be more capable systems as they have freed up computing power that can be applied to alternative tasks. Alternatively, such a system running the same functionality of other systems may be able to accomplish this using less power than previous systems.

Figure 1:
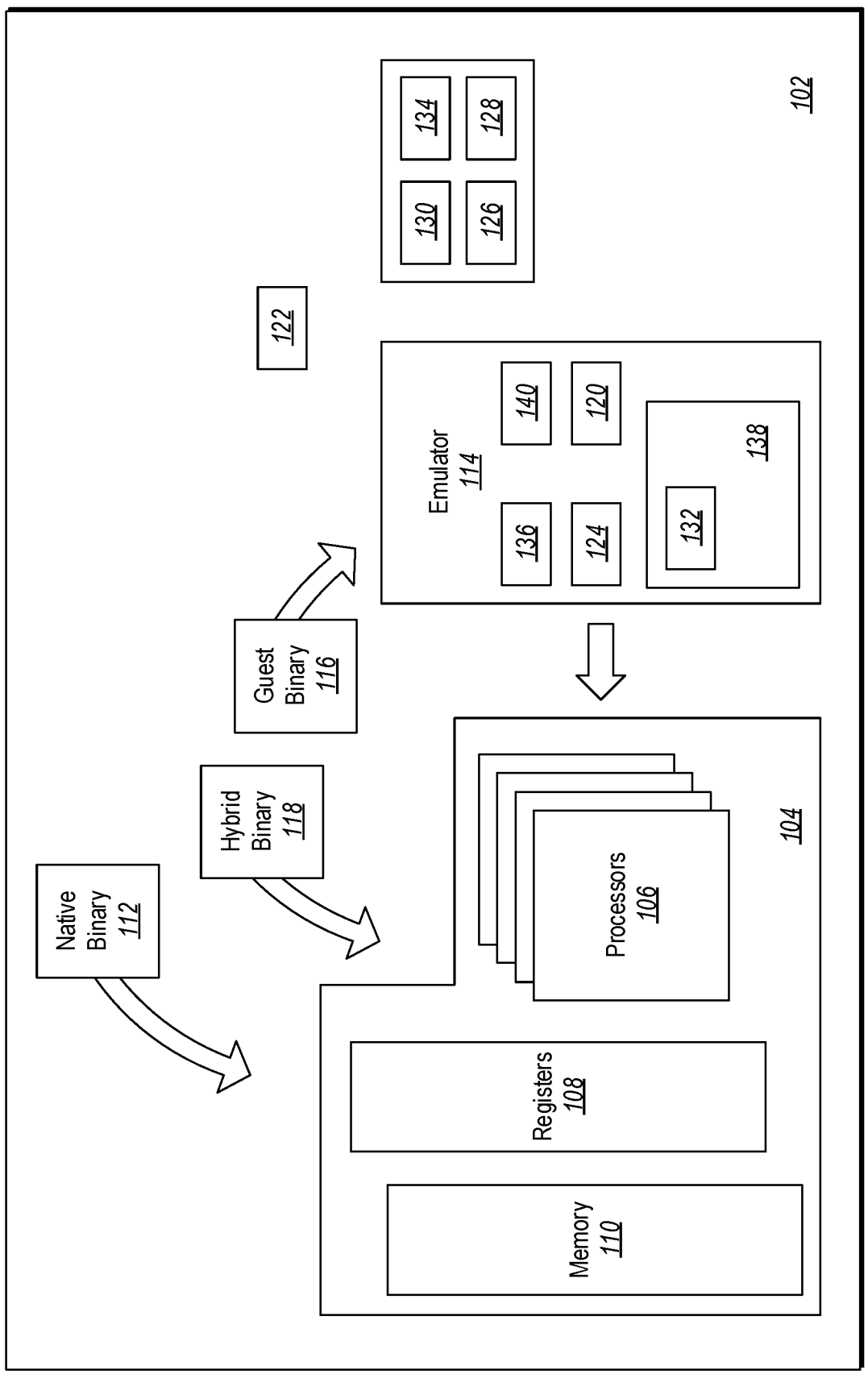
FIG. 1 illustrates a native architecture system configured to execute guest architecture binaries and hybrid binaries having native functions compiled from guest architecture source code.

FIG. 1 illustrates a native host machine 102. For example, the native host machine 102 may be an ARM 32 or ARM 64 architecture based machine. The native host machine 102 includes native hardware 104. The native hardware 104 includes components such as processors 106, registers 108 and memory 110. The native hardware 104 is configured to natively execute binaries created for the native architecture. For example, FIG. 1 illustrates a native binary 112 that can be executed directly on the native hardware 104.

Figure 2:
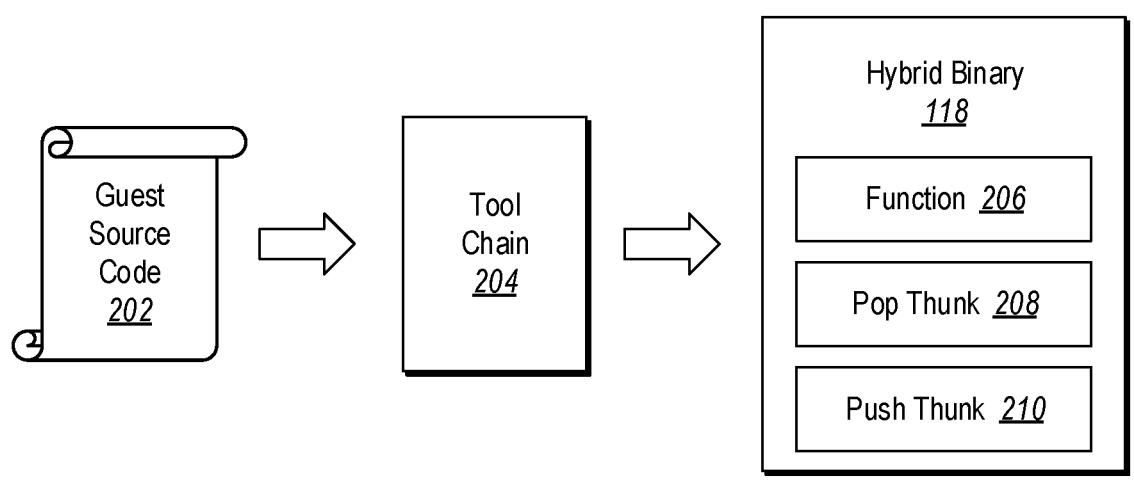
FIG. 2 illustrates using a tool chain to compile guest source code into a hybrid binary.

FIG. 1 further illustrates that the native host machine 102 includes an emulator 114. The emulator 114 runs on the native hardware 104, but is configured to handle guest binaries. For example, the emulator 114 may be an x86 emulator. This would allow x86 guest binaries to be executed on the native host machine 102 by appropriately executing the x86 binary functions using functionality of the native host machine 102. FIG. 2 illustrates an example of a guest binary 116 being executed on the emulator 114.

As noted previously, using the emulator 114 can result in increased load on the native host machine 102 and thus reduce the overall capacity of the native host machine 102. To counteract this, embodiments may make use of hybrid binaries, such as hybrid binary 118. Hybrid binary 118 is created from guest source code (see FIG. 2) but can execute (for the most part) directly on the native hardware 104 without needing to be executed using the emulator 114. Guest source code is defined as: all high level and assembly level code files, and corresponding compiler settings and preprocessor defines, associated with compiling for the guest architecture. More details of how this is accomplished are illustrated below.

FIG. 2 illustrates creating hybrid binaries. FIG. 2 illustrates a sample of guest source code 202. In this example the guest source code 202 is provided to a tool chain 204. The tool chain 204 is able to compile the guest source code 202 into binary code and in particular into the hybrid binary 118. The hybrid binary 118 includes a function 206. The function 206 is a native function configured to execute natively on native hardware 104. In other words, even though the hybrid binary 118 was created using guest source code 202, it is compiled into native code that is able to execute directly on the native hardware 104 without needing to be passed through the emulator 114.

As noted previously herein, there may be certain incompatibilities between the native architecture and the guest architecture. Because of this, the tool chain 204 is configured to generate one or more interoperability thunks. The one or more thunks are native code modules configured to perform functionality to bridge between characteristics of guest code and native code. In the example illustrated in FIG. 2, the hybrid binary 118 includes a pop thunk 208 and a push thunk 210. These particular thunks address the differences in function calls between the native architecture and the guest architecture. For example, assume that the native architecture is ARM and the guest architecture is x86. Due to the small number of architectural registers in x86 architectures, x86 calls are generally made by passing arguments onto the stack, while a return value or a pointer to a return value is passed to a register. In contrast, ARM function calls are made by direct insertion of arguments into hardware registers. The pop thunk 208 and push thunk 210 are native code stubs that can handle these differences when x86 calls are made to ARM functions and vice versa. In particular, the pop thunk 208 is configured to pop incoming data/data off of a stack and into hardware registers. Thus, when a typical x86 call calls into the hybrid binary, it will do so by placing data onto the stack. The pop thunk 208 pops this data into hardware registers so that the native function 206 can be consumed directly. At a later point, if a call to x86 code is encountered, the push thunk 210 can be used to prepare arguments for an x86-convention call, and return processing to an emulator that can perform cross compilation to handle the x86 code. While this is covered in much more detail below, FIGS. 3A-3D illustrates examples.

Figure 3A:
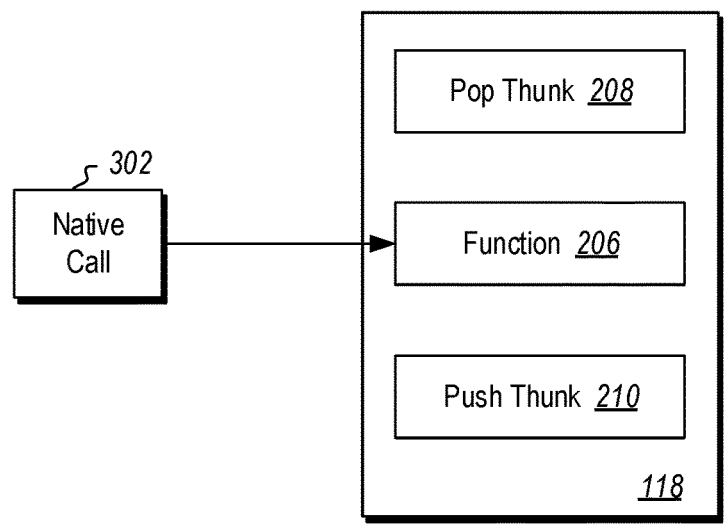
FIG. 3A illustrates a native call into the hybrid binary.

FIG. 3A illustrates an example where a native call 302 from a native function (i.e. a function compiled from native architecture source code to native architecture binary code) to the hybrid binary 118 is made. When this occurs, the native call 302 calls directly into the function 206. No thunks are needed, because the native call 302 and the function 206 are both implemented using native binary code. The function 206 returns directly to the native call 302.

Figure 3B:
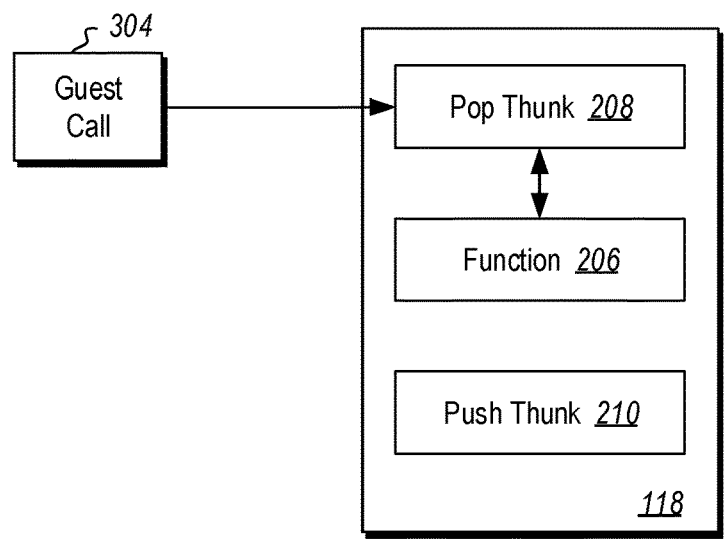
FIG. 3B illustrates a guest call into the hybrid binary.

FIG. 3B illustrates an example where a guest call 304 from a guest function (i.e. a function compiled from guest architecture source code to guest architecture binary code) to the hybrid binary 118 is made. In this case, the call is made to the pop thunk 208 to bridge the different calling mechanisms between guest architecture calls and native architecture calls. In particular, the pop thunk 208 creates a mechanism that allows the guest call 304 to function as if it is pushing data onto a stack and to receive responses in the expected manner (return register or output location). This is illustrated in more detail below. FIG. 3B further illustrates that the pop thunk 208 is able to call into the function 206 in the hybrid binary 118. The function 206 can perform the functionality it is configured to perform and return through the pop thunk 208 to the guest call 304.

Figure 3C:
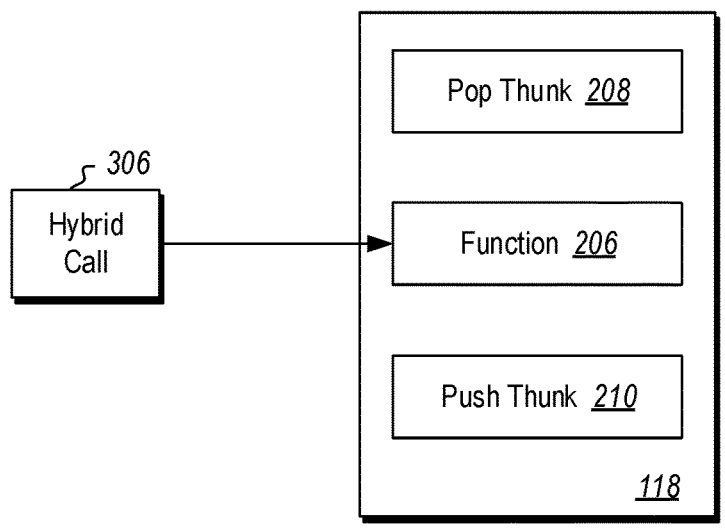
FIG. 3C illustrates a hybrid call into the hybrid binary.

FIG. 3C illustrates an example where a hybrid call 306 from a hybrid function (i.e. a function compiled from guest architecture source code to native architecture binary code) to the hybrid binary 118 is made. When this occurs, the hybrid call 306 calls directly into the function 206. No thunks are needed, because the hybrid call 306 and the function 206 are both implemented using native binary code and the system optimizes for this case. It would be technically correct for the hybrid call to pessimistically assume the target will be an x86 binary and as such push arguments on the stack and dispatch the call via the emulator. This will in turn invoke the pop thunk, undoing the callers work. To avoid this waste, the direct call optimization may be used. The function 206 returns directly to the hybrid call 306.

Figure 3D:
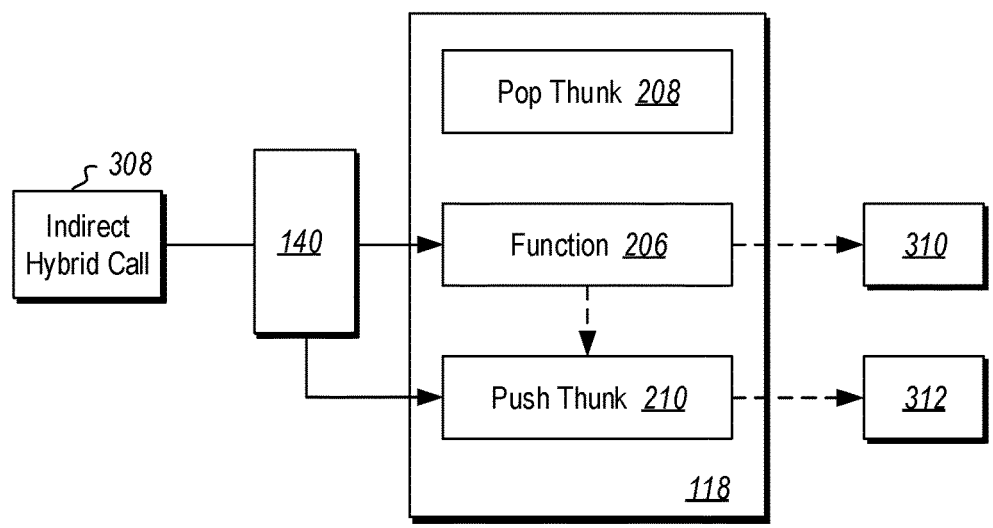
FIG. 3D illustrates an indirect hybrid call into the hybrid binary.

FIG. 3D illustrates an example where an indirect hybrid call 308 from a hybrid function (i.e. a function compiled from guest architecture source code to native architecture binary code) to the hybrid binary 118 is made. When this occurs, the indirect hybrid call 308 goes through a helper 140 (see also FIG. 1), which first does a "fast check" (e.g., using a system guest data structure and/or system native data structure as illustrated below) to check whether the target is native. If the target is native, the indirect hybrid call calls directly into the function 206 and ultimately to the native function 310. If the target is not a native target, as determined by the helper 140, processing pessimistically falls back to a slow emulator assisted call. In particular, the push thunk 210 can push data onto a stack where the guest function 312 can obtain them. The guest function 312 returns through the push thunk 210, through the function 206 back to the indirect hybrid call 308.

Note that in some embodiments, a system guest data structure (such as in one example, a bitmap) may be used to identify native functions when indirect hybrid calls are made. In particular, if a hybrid binary determines that an indirect call is being made, the hybrid binary can check the data structure, which indexes which targets are native, and/or which targets are guest targets, to determine if the target routine is native callable target or not. If the target binary is a native binary, then processing can continue by making a native call without any specialized processing as processing would proceed from the native function 206 to a native target binary. If the target binary is not a native binary, either as a result of being a guest binary or being an invalid call, then processing is passed back to the emulator 114 by using the push thunk 210, where the emulator 114 can execute the (guest) target binary by cross compilation or identify that the indirect hybrid call is an invalid call.

Note that two data structures, one describing native targets (a native data structure) and the other guest targets (a guest data structure) may be implemented. Guest code may check the latter.

Some considerations for hybrid binaries are as follows:

The hybrid shared object (and its imports) are loaded and processed by a guest loader 120 (see FIG. 1). A mechanism (such as a new machine type or presence of a special emulator directory) can be used to convey to the emulated guest loader 120 that the target binary is in fact a hybrid binary. Note that processing of the module may require assists from the native loader 122 to process any image directories that are not understood by the guest loader 120. At a minimum, the native loader 122 is notified of each hybrid binary load to ensure that the native exception handling information is properly registered with the system.

Address taken functions (e.g., functions inside virtual function tables) reference the native host callable versions (i.e., abide to the native host calling convention), not the corresponding interoperability thunk (which is responsible for converting from guest to native calling convention). Note that this includes the shared object entry point. Remapping to a guest callable version is done at runtime via an emulator assist described below.

When the guest and native bit width do not match, the generated hybrid code follows the guest width for memory address and function targets. For example, if the guest is 32-bit and the native host 64-bit, the generated code retrieves values using 32-bit operations, and then extend them to native host width prior to performing an access (data or instruction). This extends to data structures like the import descriptors. Embodiments may implement the ILP32 (Integer, Long and Pointer 32) data model into the tool chain 204.

In the specific case of an ARM32 native host, the calling convention of native code in a hybrid shared object (referred to herein as the emulator_32) convention may be almost identical to the native host ARM32 convention, except that function entry stack and parameter alignment is aligned by 4-byte, instead of by 8-byte. For example, there is no padding injected for parameter passing on the stack.

In the specific case of an ARM64 native host, there are three modifications to the calling convention of native code in a hybrid shared object which may be implemented:

1. Function entry stack and parameter alignment is aligned by 4-byte and except for char or short integer (1- or 2-byte parameter), there is no padding injected for parameter passing on the stack.

2. Passed by-value argument is always passed by-value even it is of size greater than 16 bytes and is passed via the low half of INT registers (32-bit registers: w0, w1, . . . w7).

3. HFA (Homogeneous Floating-point Aggregates) and HVA (Homogeneous Short-Vector Aggregates) are not applied.

Note that the kernel may detect the presence of the emulator directory at section create time and mark a guest data structure appropriately so as to maximize sharing across processes. In one implementation, a bitmap may be created to identify function targets that are written in native code. This can be particularly useful, as illustrated below, when a hybrid binary makes an indirect call. In this case, the hybrid binary does not know if the indirect call is to a native target or a guest target. However, embodiments can consult the guest data structure to efficiently determine if the called-to binary is native or guest.

Image Directory Format

The emulator directory (assuming ARM32 native host and x86 guest) in a hybrid binary may be formatted as follows (note that the following is just one example and other embodiments may use other functionality to implement embodiments of the invention):

Version

Guest architecture type (e.g., i386 in this example)

Native host remap list: Since every callable target exposed outside of the module is a native host callable code segment (e.g., an export function or an escaped data type), the native host remap list contains additional metadata that is used to redirect the native host target to a corresponding guest entry point.

Guest CFG data: For guest code performing indirect calls, the target is validated against the guest data structure prior to invoking the target to determine if the target is native code. For example, if a bit is set in the bitmap for a target, it is known that the target is native code. If the bit is not set, the target may be guest code, or an invalid target. For a hybrid module, the valid guest callable targets include the native host entry points described in the remap list, as well as the actual guest code targets within the guest object code section.

Guest object code range: This is a simple descriptor including the [RVA, size] describing the guest object code range within the hybrid binary. Ideally, this segment is segregated to its own aligned text section within the hybrid binary.

_os_emulator32_handler (guest calling convention). This handler is responsible for processing any exceptions that escape the guest context and propagate to a hybrid shared object frame; it is described in further detail below.

_os_emulator32_native_handler (native host calling convention). This handler is responsible for processing a native exception that is about to propagate past the native boundary and into an emulated frame. Its responsibilities are described in greater detail below.

_os_emulator32_dispatch (emulator callback and return assist). On return (from the entry pop thunks), this callback assumes the emulated EAX is loaded from r0. The guest EIP is set with the desired target address. In general, only the emulator scratch registers are guaranteed to be available.

_os_emulator32_chk_dispatch (special convention). This is identical to _os_emulator32_dispatch, but performs a guest CFG bitmap check prior to invoking the standard dispatch routine. If guest CFG bitmap checking is disabled for the process, this entry is pointed to _os_emulator32_dispatch.

_os_ emulator32_fast_dispatch (special convention emulator callback w/fast assist). The goal of the fast dispatch is to short circuit calling guest calling convention marshalling when the final target is in native code. The specific contract used to achieve this is discussed in detail below.

_os_emulator32_interlock_assist (native host calling convention). It is possible for an x86 guest to perform an interlock operation to an unaligned address. Performing a similar operation on an ARM processor results in a fatal alignment exception. The emulator addresses this at runtime by dynamically verifying the target address and only performing the interlock for conforming target addresses. For an unaligned address, the dynamically generated code falls back to a system serialized, non-interlocked path for the specified target address. Thus, for any target address in a hybrid binary that could potentially lack appropriate alignment, a similar code sequence is emitted. For example:

```
<If target address is properly aligned>
    <Directly perform interlock sequence>
<Otherwise>
    <Invoke ___os_emulator32_interlock_assist (BEGIN)>
    <Perform non-atomic load, modify, store cycle>
    <Invoke ___os_emulator32_interlock_assist (END)>
```

Alternatively, the emulator 114 may provide a set of native host callable interlocked helpers each of the various interlocked intrinsics (i.e., interlocked increment, interlocked exchange add, etc.), which then may be invoked by the hybrid binary if the inline alignment check fails. There may be certain cases in which interlocked operations go through an emulator assist, due to the possibility of aligned and unaligned interlocked operations targeting an overlapping memory region. Rather than addressing this in the hybrid module via additional checks, embodiments may be implemented where the application falls back to using the guest binaries directly, such that the serialization is handled exclusively by the runtime cross compiler 124 in the emulator 114.

Register Mapping

Referring now to FIGS. 4A and 4B, an example integer register mapping 402A and 402B, assuming an x86 guest/ARM32 native is shown. The remainder of this document focuses on examples using an ARM32 native host, though the discussion may be simply extended to ARM64 using the register mapping 502A and 502B shown in FIGS. 5A and 5B.

Exception Handling

For exception handling, there should be a model to allow exceptions from hybrid code to flow to a guest code, and for an exception in guest code to pass over native frames and be visible to a higher guest frame. A guest handler typically cannot continue a native exception, as discussed herein. Embodiments will include mechanisms to enable this handling. One specific embodiment and mechanism is now illustrated.

Exception handling optimizes for enabling exceptions within hybrid shared objects to abide to native exception dispatch rules as far as possible. This is a significant simplification to the tool chain as it does not require guest specific exception semantics to be brought forth to the native host architecture (e.g., x86 Structured Exception Handling frame chain).

A typical application has stack frames that correspond both to emulated guest stack frames as well as hybrid stack frames.

Once hybrid shared objects are introduced, it becomes difficult to pass exceptions between emulated and hybrid code. Except for a few special cases, the exception context becomes meaningless once the emulation boundary is crossed. For example, emulated code cannot reasonably inspect and modify an exception context that references code inside a hybrid module. Furthermore, due to the loss of fidelity when a native host context is converted to a guest context, it may not even be possible for an emulated handler to blindly restore a native exception.

There are two specific cases of exception dispatch, namely exceptions in hybrid code, and exceptions within emulated code.

For exceptions within hybrid code, the native exception unwinder 126 can unwind execution until a guest entry thunk is encountered. Any exception that is handled prior to this point is processed by the native exception dispatch engine 128. A side effect of this behavior is that the exception and context record passed to hybrid handlers are native host data types, rather than guest data types. Thus, hybrid components expecting to access a guest context (for example) encounter unexpected behavior. To guard against this behavior, accessors are conditionally defined during hybrid compilation to return strongly typed data structures. To achieve processing by the native exception dispatch engine 128, the following two conditions apply:

1. Each hybrid module's exception information is registered with the native exception dispatcher 130 (rather than the guest dispatcher 132).

2. Each hybrid module is linked to the native variants of the operating system exception handling routines (e.g.,_C_specific_handler) rather than the hybrid variant (which is only intended for processing guest exceptions). This linkage can be achieved by ensuring the hybrid tool chain 204 emits references to specially named variants of these functions, which the runtime emulator 114 may subsequently patch to refer to the appropriate native variant.

If the exception is not handled within the hybrid module frames and reaches an interoperability thunk, in the native ARM example, registered .pdata results in invocation of the _os_emulator32_native_handler. The primary responsibility of the native handler 134 is to determine whether the exception falls into a special class of native exceptions that can be handled and resumed directly (for example, adjusting a page protection). If not, the native handler 134 ensures the native context is unwound to the caller (effectively undoing the effect of a pop thunk), convert the resultant context to a guest context, and save the resultant guest context in a location that can be retrieved by the emulated code. Thus, when the exception is reflected to the emulated dispatcher 132, it sees an exception with context that suggests an exception occurred immediately upon returning from a hybrid function. This mechanism allows the native exception to be subsequently propagated through the emulated exception chain 138, which is required for correct operation of system routines such as RaiseException (which reside in hybrid code).

For exceptions within emulated code, if an exception is generated within emulated code, the native exception dispatcher 130 immediately skip any intervening native frames (which can be done using a runtime exception table describing the code cache) and reflect exception dispatching to the guest code. The native exception dispatcher 130 unwinds emulated frames until a hybrid push thunk is detected (i.e., a transition from native to emulated code). This results in the invocation of _os_emulator32_handler, which performs a direct invocation of the guest unhandled filter, (which in turn has a special provision to handle internal guest exceptions as above).

As a result of this policy, application exceptions cannot be handled by system code, and exceptions within hybrid modules can be only partially handled by emulated code (i.e., a full fidelity resume from emulated code may not be supported). While this should be acceptable it is possible that there are cases in which some sort of application compatibility issue may be exposed. To ensure this class of applications continues to function under emulation, embodiments may disable hybrid shared objects use and fall back to traditional emulated shared objects. For specific instances of system code which is able to handle emulated exceptions for compatibility reasons, it is possible to address this issue by invoking the application (emulated) callback via a guest invocation stub (which, by definition, lives in the guest object code section). While this adds an additional frame on the stack, it allows the system invocation stub to continue handling the emulated exception.

Interoperability Thunks

As noted above, calls between ARM native host and X86 guest code (runtime JITed code) is handled by a special pop thunk (X86 to ARM conversion) and push thunk (ARM to X86 conversion), where parameter marshalling and stack adjustment are performed. These thunks may be configured to cover X86 conventions including: cdecl, stdcall, and fastcall.

A pop thunk 208 is created by the compiler BE (backend) in the tool chain 204 for each external callable function, such as address-taken function, exported function, or virtual function of externally escaped types. A typical pop thunk operation may be, for example, to pop the return address to a non-volatile register, pop incoming arguments to registers r0-r3, s0-s16, or d0-d7 (for the illustrated examples) (see FIGS. 4A and 4B) and invoke its corresponding ARM native function. Then upon its return, the thunk restores the return value in an emulated EAX and jumps to _os_emulator32_dispatch with the return address pushed earlier. The implementation of pop thunk is configured to avoid destroying data in r7-r9 (or x19-x21 on ARM64) as these registers are mapped to nonvolatile registers of guest code (EBX, ESI, and EDI).

The following example illustrates a pop thunk for a _cdecl function:

```
__int64 __cdecl foo(int i, int j, int k)
// --- Arm32 version ---
_foo_emulator32_pop:
only
    pop     {r5,r0,r1,r2}              // return-addr saved in r5
    bl      _foo                       // native host native version (X86 name)
    mov     r4, r0                     // move return value to r4 (EAX)
    mov     r6, r1                     // move return value to r6 (EDX)
    sub     sp, sp,0x0C                // push back stack (for __cdecl only)
    mov     r3, r5                     // dispatch addr in r3 (EIP)
    b       __os_emulator32_dispatch   // return to guest code via dispatcher
// --- Arm64 version ---
_foo_emulator64_pop:
only
    ldr     x27,[x28]                  // return-addr saved in x27
    ldrp    w0,w1,[x28+4]              // 4-byte load 1st & 2nd parameters
    ldr     w2,[x28+12]                // 4-byte load 3rd argument
    add     x28, x28, 16               // pop stack
    bl      _foo                       // native host native version (standard X86 name)
    mov     x8, x27                    // dispatch addr in x8 (EIP)
    mov     x27, x0                    // move lower half of ret-value to x27 (EAX)
    movi    x1, 0
    orr     x1, x0, 32                 // move upper half of ret-value to x1 (EDX)
    sub     x28, x28,0x0C              // push back stack (for __cdecl only)
    b       ___os_emulator64_dispatch  // return to guest code via dispatcher
```

The following example illustrates a pop thunk for a __fastcall

```
__int64 __fastcall foo(int i, int j, int k)
// --- Arm32 version ---
_foo_emulator32_pop:                                    // Internal name for Emulator remapping only
mov         r0, r5                                      // move ECX to r0
mov         r1, r6                                      // move EDX to r1
pop         {r5, r2}                                    // return-addr saved in r5
bl          _foo                                        // native host native version (X86 name)
mov         r4, r0                                      // move return value to r4 (EAX)
mov         r6, r1                                      // move return value to r6 (EDX)
                                                        // no sp adjustment for __fastcall
mov         r3, r5                                      // dispatch addr in r3 (EIP)
b           ___os_emulator32_dispatch                   // return to guest code via dispatcher
// --- Arm64 version ---
_foo_emulator64_pop:                                    // Internal name for Emulator remapping only
ldr         x27,[x28]                                   // return-addr saved in x27; x0, x1 loaded
ldr         x2,[x28+4]                                  // copy 3rd argument to x2
add         x28, x28, 8                                 // pop stack
bl          _foo                                        // native host native version (standard X86 name)
mov         x8, x27                                     // dispatch addr in x8 (EIP)
mov         x27, x0                                     // move lower half of ret-value to x27 (EAX)
movi        x1, 0
orr         x1, x0, 32                                  // move upper half of ret-value to x1 (EDX)
                                                        // no sp adjustment for __fastcall
b           ___os_emulator64_dispatch                   // return to guest code via dispatcher
```

The following example illustrates a pop thunk for a variadic function:

```
__int64 foo(int i, __int64 j, ...)
// --- Arm32 version ---
_foo_emulator32_pop:                        // Internal name for Emulator remapping only
pop   {r5,r0,r1,r2,r3}      // pop all 4 int args
bl    _foo                  // native host native version (X86 name)
mov   r4, r0                // move return value to r4 (EAX)
mov   r6, r1                // move return value to r6 (EDX)
sub   sp, sp,0x10           // push back stack (it's __cdecl)
mov   r3, r5                // dispatch addr in r3 (EIP)
b     ___os_emulator32_dispatch  // return to guest code via dispatcher
// --- Arm64 version ---
_foo_emulator64_pop:                        // Internal name for Emulator remapping only
ldr   x27,[x28]             // return-addr saved in x27
ldr   w0,[x28+4]            // 4-byte load 1st parameter
ldrp  w1,w2,[x28+8]         // load for 2nd & 3rd for __int64
ldrp  w3,w4,[x28+16]        // 4-byte load pair for ellipse parameters
ldrp  w5,w6,[x28+24]        // 4-byte load pair for ellipse parameters
ldr   w7,[x28+32]           // 4-byte load for ellipse parameters
add   x28, x28, 40          // pop stack
bl    _foo                  // native host native version (standard X86 name)
mov   x8, x27               // dispatch addr in x8 (EIP)
mov   x27, x0               // move lower half of ret-value to x27 (EAX)
movi  x1, 0
orr   x1, x0, 32            // move upper half of ret-value to x1 (EDX)
sub   x28, x28,0x24         // push back stack (it's __cdecl)
b     ___os_emulator64_dispatch  // return to guest code via dispatcher
```

Each pop thunk would also have a .pdata registration that is configured to invoke _os_emulator32_native_handler in the event an unhandled exception propagates past the hybrid call boundary. To properly unwind from a hybrid host call chain to the state of the guest caller, the native exception unwinder (_os_emulator32_native_handler described above) is able to handle the special thunk convention. Since, in the illustrated example, the return address is saved in r5 (x27 on ARM64), the stack adjustment is the only information that need be recorded. This can be achieved by adding unwind code that records the stack state of pop thunk.

In contrast to the pop thunk, a static push thunk is created to convert a call originating from hybrid native code to X86 convention. A push thunk is used for a call where the callee function is not visibly defined and compiler is not certain whether or not it is a native or a guest function (e.g. an x86 assembly function). What a typical push thunk does is to push outgoing arguments from r0-r3, s0-s16, or d0-d7 (or x0-x7 and d0-d7 on ARM64) to the stack properly, compute and push the return address (the instruction following the jump to dispatcher) to the stack, and jump to _os_emulator32_dispatch with the address of its buddy x86 guest function. Then upon its return, the code restores the return value (e.g., from EAX [r4] to r0) and perform a normal ARM return.

The following illustrates a static push thunk for a _cdecl function

```
    __int64 foo(int i, int j, int k)
    // --- Arm32 version ---
    _foo:                                   // standard x86 name
    push    {r0,r1,r2}                      // push outgoing argument
    mov     r7, lr                          // native host ret-address preserved in r7
    add     r0, pc,0x10                     // return address of dispatch
    push    {r0}                            // push ret-addr of dispatch
    movw    r3, foo__wow32__x86             // guest X86-code (Linker fix up)
    movt    r3, foo__wow32__x86
    b       __os__emulator32__dispatch
    mov     r0, r4                          // move ret-value to r0 from EAX
    mov     r1, r6                          // move ret-value to r1 from EDX
    add     sp, sp,0x0C                     // pop stack (for _cdecl only)
    mov     pc, r7                          // regular Arm return
    // --- Arm64 version ---
    _foo:                                   // standard x86 name
    stp     x0, x1, [x28,-12]!              // push 1st & 2nd arguments
    str     x2, [x28,8]!                    // push 3rd arguments
    mov     x21, lr                         // native host ret-address preserved in x21
    adr x0, |$ret__addr|                    // return address of dispatch
    str     x0, [x28,-4]!                   // push return address of dispatch
    adrp    x8, |foo__wow64__x86|           // guest X86-code (Linker fix up) to EIP
    add     x8, x8, PageOffset(|foo__wow64__x86|)
    b       __os__emulator64__dispatch
|$ret__addr|
    add     x0, x27, LSL(x1,32)             // move ret-value from EAX, EDX to upper x0
    add     x28, x28,0x0C                   // pop stack (for _cdecl only)
    ret     x21                             // regular Arm64 return
```

The following illustrates a static push thunk for a _fastcall function

```
    __int64 __fastcall foo(int i, int j, int k)
    // --- Arm32 version ---
    _foo:                                   // standard x86 name
    mov     r5, r0                          // move r0 to ECX
    mov     r6, r1                          // move r1 to ECX
    push    {r2}                            // push outgoing argument
    mov     r7, lr                          // native host ret-address preserved in r7
    add     r0, pc,0x10                     // return address of dispatch
    push    {r0}                            // push ret-addr of dispatch
    movw    r3, foo__wow32__x86             // guest X86-code (Linker fix up)
    movt    r3, foo__wow32__x86
    b       __os__emulator32__dispatch
    mov     r0, r4                          // move ret-value to r0 from EAX
    mov     r1, r6                          // move ret-value to r1 from EDX
                                            // no sp pop for _fastcall
    mov     pc, r7                          // regular Arm return
    // --- Arm64 version ---
    _foo:                                   // standard x86 name, ECX/EDX loaded
    str     x2, [x28,4]!                    // push 3rd arguments
    mov     x21, lr                         // native host ret-address preserved in x21
    adr x0, |$ret__addr|                    // return address of dispatch
    str     x0, [x28,-4]!                   // push return address of dispatch
    adrp    x8, |foo__wow64__x86|           // guest X86-code (Linker fix up) to EIP
    add     x8, x8, PageOffset(|foo__wow64__x86|)
    b       __os__emulator64__dispatch
|$ret__addr|
    add     x0, x27, LSL(x1,32)             // move ret-value from EAX, EDX to upper x0
                                            // no sp pop for _fastcall
    ret     x21                             // regular Arm64 return
```

The following illustrates a static push thunk for a variadic function

```
    int foo(int i, __int64 j, ...)
    // --- Arm32 version ---
    _foo:                                   // standard x86 name
```

```
push     {r0,r1,r2,r3}                      // push all 4 outgoing regs
mov      r7, lr                             // native host ret-address preserved in r7
add      r0, pc,0x10                        // return address of dispatch
push     {r0}                               // push ret-addr of dispatch
movw     r3, foo__wow32__x86                // guest X86-code (Linker fix up)
movt     r3, foo__wow32__x86
b        ___os_emulator32__dispatch
mov      r0, r4                             // move ret-value to r0 from EAX
add      sp, sp,0x10                        // __vararg is __cdecl
mov      pc, r7                             // regular Arm return
// --- Arm64 version ---
__foo:                                      // standard x86 name
str      w0, w1,[x28,-32]!                  // push all outgoing regs
stp      w2, w3, [x28,8]
stp      w4, w5, [x28,16]
stp      w6, w7, [x28,24]
mov      x21, lr                            // native host ret-address preserved in x21
adr x0,  |$ret__addr|                       // return address of dispatch
str      x0, [x28,-4]!                      // push return address of dispatch
adrp     x8, |foo__wow64__x86|              // guest X86-code (Linker fix up) to EIP
add      x8, x8, PageOffset(|foo__wow64__x86|)
b        ___os_emulator64__dispatch
|$ret__addr|
add      x0, x9                             // move ret-value from EAX to upper x0
add      x28, x28, 36                       // pop stack (vararg is __cdecl)
ret      x21                                // regular Arm64 return
```

Note that in some embodiments, the compiler in the tool chain 204 takes special care around the call-site of a push thunk to save the nonvolatile native host registers mapped to volatile guest registers (which in the illustrated example are r4-r6 under ARM32, and x27 under ARM64), as well as at least one additional native host nonvolatile register mapped to a guest nonvolatile (potentially r7 under ARM32, and x21 under ARM64) to preserve the native host return address, as appropriate. This has the side effect that even static import calls proactively save these registers as it is unknown a priori whether the target is actually a push thunk.

One effective optimization to this policy can be as follows: If the target function signature is either variadic or requires stack based arguments, the caller saves the aforementioned nonvolatile registers in the calling frame such that both registers are available to the target push thunk. Otherwise, the target push thunk can establish an entirely new call frame, spilling the link register and explicitly saving the native host nonvolatile corresponding to a guest volatile. The caller need not save any registers prior to the call.

The indirect calling sequence that leverages a push thunk is described in further detail below.

Naming and Linkage

The linkage of native host functions, guest functions and push and pop thunks relies on distinct names across the four conventions (__fastcall, __cdecl, __standard-c, and variadic; the thunks for __standard-c are not illustrated above as they are similar to __cdecl). Guest functions and pop thunks are decorated with the emulator32/emulator64 internal convention while native host functions and push thunks are named according to the corresponding guest convention.

Pop thunks serve as the gateway from JITed guest functions to native host functions. Native host native versions, named using the standard guest signature, are guaranteed to never be invoked by JITed guest code directly.

Push thunks are named as guest code, but emitted as a weak-link contribution that is discarded by the linker if a real contribution is existent, i.e., the binding of an external native host function is done during linkage time automatically.

Indirect/Virtual Call Sequence

For any indirect function target invoked from within a hybrid shared object (see e.g. FIG. 3D), there is a possibility that the target may be either a guest function (e.g., guest function 312) or a native function (e.g., native function 310). In the case of a virtual function dispatch, it is very likely that the target will end up being a native function (possibly in another hybrid shared object). As such, the code generation in the hybrid shared object assumes a native target to eliminate the cost of marshalling to and from the guest calling convention. However, the compiler also generates an icall push thunk (very similar to the static push thunk above for external defined functions) and passes its address to the dispatcher in case the target is determined to be a guest function. In other words, the binding of an indirect target is done by the emulator 114 (see FIG. 1) at runtime.

To achieve this, any frame that invokes an indirect target from within a hybrid shared object may use a convention of the following format:

Insert a guest exception registration record on the emulated stack that is registered to invoke_os_emulator32/64_handler.

Save any nonvolatile registers that may be destroyed as part of the callout. This is minimally the set of nonvolatile registers that correspond to guest volatile registers or emulator scratch registers, as well as at least one register corresponding to a guest nonvolatile (the latter is only required if the emulator can destroy the native host link register). Note that nonvolatile register save is required as it is possible fast dispatch will fail and a push thunk is invoked to redispatch the invocation via the emulator. This process can be treated identically to a static import which may ultimately invoke a push thunk, and thus, a similar optimization may be employed to obviate unnecessary register saves in the calling frame.

Invoke the emulator fast dispatch helper (_os_emulator32/64_fast_dispatch) with a native call sequence, passing the target address and a calling convention thunk in two available native host registers. This convention implies that the normal native host parameter registers is considered live. Note there is a single calling convention thunk per indirect call signature type, rather than one per call site.

The emulator performs a native data structure check (if appropriate) and invokes the native routine if it exists via a tail call jump. Otherwise, it invokes the calling convention thunk, passing the desired target address.

Thus, a typical helper call sequence would appear as follows:

```
<Save native host nonvolatile registers as required>
<Load target IP (r4/x8), convention thunk address (r5/x9)>
<Invoke fast dispatch helper>
```

The following Illustrates an example of an indirect call to _int64 (*ptr)(int i, int j, int k, int l)

```
// Arm32 version
// assuming the indirect call address is in rx
...                                              // save r4-r7 (& r8 for complicated thunks)
...                                              // outgoing arguments in r0-r3 & stack
mov     r4, rx                                   // move target address to r4
movw    r5, __pushthunk_xyz_emulator32           // push thunk address in r5
movt    r5, __pushthunk_xyz_emulator32           // push thunk address in r5
bl      ___os_emulator32_fast_dispatch
// Arm64 version
// assuming the indirect call address is in xn
...                                              // save x27 & x21 as appropriate
...                                              // outgoing arguments in w0-w7 & stack
mov     x8, xn                                   // move target address to x8
adrp    x9, |__pushtk_xyz_emulator64|            // put thunk address in x9
add     x9, x9, PageOffset(|__pushtk_xyz_emulator64|)
b       ___os_emulator64_fast_dispatch           // with x21, x27 side effect
```

The push thunk marshals to the appropriate x86 calling convention, and then proceeds to push an updated return PC (program counter, see FIG. 5A) on the stack so that the return value can be marshalled. If applicable, the native host link register is live at this point and can be preserved across the emulator call in a register corresponding to a guest nonvolatile (or spilled to the stack).

The push thunk performs a jump to _os_emulator32/64_chk_dispatch passing the target address in EIP.

On return from the emulator, the emulator EAX (& EDX) is loaded in r0 (&r1/x0), the stack is restored if it is a _cdecl function, and the true return target is retrieved from the original guest nonvolatile value (or the stack). Hybrid code execution is resumed by a branch to the original return target.

The following illustrates an example: Icall push thunk of an indirect call to _int64 (*ptr)(int i, int j, int k, int l)

```
// Arm32 version
__pushthunk_xyz_emulator32:         // emulator32 signature
push    {r0,r1,r2,r3}               // push outgoing argument
mov     r7, lr                      // native host ret-address preserved in r7
add     r0, pc,0x0C                 // return address of dispatch
push    {r0}                        // push ret-addr of dispatch
mov     r3, r4                      // target is in r4, load to EIP
b       ___os_emulator32_chk_dispatch
mov     r0, r4                      // move ret-value to r0 from EAX
mov     r1, r6                      // move ret-value to r1 from EDX
add     sp, sp,0x0C                 // pop stack (for _cdecl only)
mov     pc, r7                      // regular Arm return
// --- Arm64 version ---
__pushtk_xyz_wow64:                 // emulator64 signature
stp     w0, w1, [x28,-16]!          // push 1st & 2nd arguments
stp     w2, w3, [x28,8]             // push 3rd & 4th arguments
mov     x21, lr                     // native host ret-address preserved in x21
adr x0, |$ret_addr|                 // return address of dispatch
str     w0, [x28,-4]!               // push return address of dispatch
                                    // target already in EIP (x8)
b       ___os_emulator64_chk_dispatch
|$ret_addr|
add     x0, x27, LSL(x1,32)         // move ret-value from EAX, EDX to upper x0
add     x28, x28,16                 // pop stack (for _cdecl only)
ret     x21                         // regular Arm64 return
```

Export & Import Routines

Export functions have a native host callable variant, which is the version indicated by the module's export table. For a guest function, such as an ASM routine, a push thunk is automatically generated as described earlier for external defined function references. In the event that an exported function is not referenced in its home component (which is likely to be rare), a linkage error is issued, which in turn can be addressed by adding a dummy wrapping function.

As for imports, import references from a hybrid shared object are targeted towards the native callable export. More specifically, the addresses in the hybrid IAT (import address table) point to native host functions or static push thunks for guest code, bypassing any sort of emulator assist. Notably, the caller of a hybrid import function observes the indirect call sequence/register save protocol outlined above as the target may in fact be a push thunk for a guest function. Unlike the indirect call sequence described above, a standard import sequence is used:

```
adrp    x8, __imp_foo           // Load address from IAT
ldr     x8,[x8,PageOffset(__imp_foo)]//
blr     x8                       // Invoke target
``` where __imp_foo is the fixed up import symbol for foo in the IAT, pointing to either native host code or a static push thunk in the target binary.

Complicated Thunks & Marshalling Helpers

While the implementation of most pop/push thunks are straightforward, it can become complicated in the presence of floating point or XMM arguments.

For instance, the pop thunk of foo(int aa, int bb, int cc, int dd, int ee, float fpx) pops fpx out from the middle of the stack to register s0 and ee is shifted up 4-byte to fill in the slot fpx left. On the other hand, the push thunk of foo pushes register s0 into the middle of stack position right before argument ee.

To simplify the code generation complexity and to reduce the overall code size increase due to thunking, two types of generic marshalling helpers are illustrated.

A pop helper can be called at the beginning of a pop thunk to perform any complex parameter marshalling described in a parameter mapping, referred to herein as pmap. This pmap, computed by the compiler, is put at the end of the thunk as a literal pool, passed via r4 to the helper. Upon the return of this helper, the pop thunk can assume that arguments are popped and the stack is adjusted properly, and is ready for the calling to the native host emulator32 function. The following illustrates an example:

Example: Pop thunk of int foo(int, int, int, int, int, float, float, int)

```
// --- Arm32 version ---
__foo_emulator32_pop:                  // Internal name for Emulator remapping only
pop     {r5}                           // ret-addr saved in r5
ldr     r4,|$pop_pmap1|                // load address of p-map
bl      __pop_Helper_4i2f              // call marshalling helper
bl      _foo                           // standard x86 name
mov     r4, r0                         // move return value to r4 (EAX)
sub     sp, sp,0x18                    // push back stack (4*int+2*fp = 0x18)
mov     r3, r5                         // dispatch addr in r3 (EIP)
b       __os_emulator32_chk_dispatch   // return to guest code via dispatcher
// -- literal pool of thunk _foo --
|$pop_pmap1|
DCD     0x00010203                     // the stack slots for r0-r3
DCD     0x0506                         // the stack slots for s0,s1
```

Example: Pop thunk of float foo(int, int, int, int, int, int, int, int, int, float, int, float)

```
// --- Arm64 version ---
_foo_emulator64_pop:                   // Internal name for Emulator remapping only
    ldr     x27,[x28]                  // return-addr saved in x27
    adr     x9, |$pop_pmap2|           // load the address of p-map
    bl      __pop_helper_8i4f          // call marshalling helper
    bl      _foo                       // native host native version (standard X86 name)
    mov     x8, x27                    // dispatch addr in x8 (EIP)
    mov     s31, s0                    // move ret-value in s0 to s31 (R0)
    sub     x28, x28,0x28              // push back stack (8*int+2*fp = 0x28)
    b       __os_emulator64_chk_dispatch   // return to guest code via dispatcher
|$pop_pmap2|
    DCQ     0x0001020304050607         // the stack slots for w0-w7
    DCD     0x090bffff                 // the stack slots for s0-s3 (0xff = n/a)
```

Similarly, a push helper can be used in a push thunk to push and inject arguments into the stack. Upon the return of the helper, the push thunk can assume the stack is set up appropriately for the call to guest code. Under ARM64, the push helper preserves the volatile register x8 containing the actual target. Both the push and pop helpers can be coded in assembler to ensure the custom calling convention is honored. The following illustrates an example:

Example: Icall Push thunk to int (*ptr)(int, int, int, int, double, int, double, double)

```
__pushthunk__wyz__emulator32:    // emulator32 signature
mov      r8, lr                  // native host ret-address preserved in r8
ldr      r5,|$push_pmap2|        // load address of p-map
bl       __push_Helper_8i4d      // call marshalling helper
add      r0, pc,0x0C             // return address of dispatch
push     {r0}                    // push ret-addr of dispatch
mov      r3, r4                  // target is in r4
b        ___os__emulator32__chk__dispatch
mov      r0, r4                  // move ret-value to r0 from EAX
add      sp, sp,0x28             // pop stack (4*Int + 3*double = 0x28)
mov      pc, lr                  // regular Arm return
|$push_pmap1|                    // -- literal pool --
DCD      0x00010203              // the stack slots for r0-r3
DCD      0x040607                // the stack slots for d0-d2
```

Example: Icall push thunk to double (*ptr)(int, int, int, int, int, int, int, int, int, double, double)

```
__pushtk__xyz__wow64:            // emulator64 signature
mov      x21, lr                 // native host ret-address preserved in x21
adr      x9,|$push_pmap2|        // load address of p-map
bl       __push_Helper_8i4d      // call marshalling helper
adr x0,  |$ret_addr|             // return address of dispatch
str      w0, [x28,-4]!           // push return address of dispatch
b        ___os__emulator64__chk__dispatch    // target already in EIP (x8)
|$ret_addr|
mov      d0, d31                 // move ret-value from r0 (d31) to d0
add      x28, x28,48             // pop stack (8*Int + 2*double = 48)
ret      x21                     // regular Arm64 return
|$push_pmap2|
DCQ      0x0001020304050607      // the stack slots for w0-w7
DCD      0x090affff              // the stack slots for d0-d3
```

Compatibility Considerations

Applications that rely on the ability to inspect (and/or modify) system binary code may encounter compatibility issues in the face of hybrid binaries, as they observe native host native code in place of the typical expected guest (e.g., x86) code. For example, the popular Detours infrastructure available from Microsoft Corporation of Redmond, Wash., which allows for third party system API interception, leverages the ability to modify the code stream to insert trampolines to a custom "hook" routine. With hybrid binaries, this sort of behavior likely results in an unintentional corruption and subsequent crash of the application. To mitigate this issue, three possibilities are illustrated below:

1. Identify common routines targeted for patching and move them to the guest object code section (i.e. disable the hybrid code optimization for such routines).

2. Incur a slight performance penalty for guest code by modifying the interoperability thunks to include a small guest code prolog, specially designed to facilitate guest code interception.

3. Fallback to the set of traditional guest binaries (i.e., binaries containing guest object code only). In this scenario, the emulator 114 resumes responsibility for dynamically generating native code representing the system binaries.

(Note that the fallback could be enabled either globally or on a per application basis. Furthermore, to mitigate the footprint impact of carrying both the hybrid binaries and the traditional guest binaries, the guest binary package are downloaded on demand.)

A slightly more complex example that can be problematic are binaries that utilize a Get/SetContext paradigm (i.e., a thread hijack such as that employed by the CLR), as they expect the ability to retrieve and later restore an x86 context. However, if a thread is executing within a hybrid binary, it may very well be using native host register state that is lost during the translation to an x86 context, and thus subsequently lost on a context restore. Thus, in the most generic case, the mitigation is to leverage the set of traditional x86 guest binaries (i.e., lose the hybrid binary mitigation). However, if the application leverages the more standard Suspend/GetContext/SetContext pattern, the emulator runtime can force the application to a quiescent point prior to issuing the suspend, which in turn ensures that the only "live" register state is the emulated x86 register state; this co-ordination will occur whenever the dispatcher is entered, which includes system service invocation (such as a wait system call). As a result, such apps (including the CLR) continue to operate as expected in the face of hybrid binaries.

Hybrid binaries may potentially impact the developer experience; a guest debugger will break when attempting to disassemble, single step, or break on code that resides inside a hybrid binary. However, a native host debugger that is aware of hybrid binaries may be implemented to cooperate with the emulator to facilitate debugging (i.e., automatically switch between guest and native modes). Alternatively, embodiments may fall back to purely emulated guest binaries when running under the debugger.

Hybrid Compilation

The following illustrates one example of hybrid binary compilation. The example illustrated is in the context of the Windows build system available from Microsoft Corporation of Redmond, Wash. However, it should be appreciated that the principles can be applied in other build systems. Since the compiler frontend (FE) and backend (BE) today are both single-targeting, extra effort is required either in the Windows build system or the tool chain to generate hybrid binaries due to the presence of intrinsics, inline assembler, and the like. To minimize the impact to the Windows build system, a hybrid compilation is described below:

Emulator hybrid components are built with -Gy (such that each function is a comdat contribution). Note that this should not be a problem for Windows today as Pogo build components are default with -Gy.

A CL:/emulator option is added for compiler driver CL.exe. Under this option, CL issues a two pass compilations:

1) Invokes regular X86 C1 and C2 with option -Gy -GL- and Ob0:
  Code is built with non-LTCG and no inline to minimize the need of emulated code.
  Output objects are saved in the obj directory as usual.
2) Invokes native (e.g. ARM64/ARM32) C1 and C2 with default build options (which can be either LTCG or non-LTCG), in addition to/emulator (and /ILP32 if appropriate)
  FE: With/ILP32, pointer size is 32-bit, including those in vf-tables
  FE: With/wow, name decoration is performed according to the X86 convention that has distinct names for the_cdecl,_stdcall and_fastcall convention
  FE: With/wow, skips functions that cannot be built for the native host target, such as functions containing inline assembly, XMM, any unsupported X86 specific intrinsic, or specifically annotated to be placed in the guest section. Certain intrinsics, such as those pertaining to the FS segment register (i.e. the emulated thread TEB), may be supported in the FE to minimize the number of functions that are relegated to the guest code section.
  BE: Code is generated to handle inter-op, convention marshalling, and exception handling as described earlier
  Output objects are saved in a special wow*/subdirectory of the obj folder. (i.e. emulator64/foo.obj)
  Librarian: A/emulator option is added for lib.exe; with this option, the librarier performs a two passes operation—one under the wow*/directory and one on the regular obj directory.
  Linker: A/emulator option is added for link.exe; with this option the linker searches wow*/*.obj, or wow*/*.lib directories first, followed by regular directory paths. Since every function is built as an individual contribution (comdat), the X86-version in the regular build is discarded if it already exists in the wow*/path.
  For example, assuming a emulator64 build:

```
link /emulator64 obj\i386\a.obj, obj\i386\b.lib ... →
link obj\i386\emulator64\a.obj, obj\i386\a.obj, obj\i386\emulator64\b.lib, obj\i386\b.lib,...
```

Dispatcher

The core emulator dispatcher can remain unchanged, as compared to previous dispatchers due to the presence of either hybrid or persistent cached binaries; this code will continue to perform a fast translation of a guest instruction pointer to an equivalent host instruction pointer and jump to the intended target. Primary dispatch will stem from guest code, and will search for a guest callable target. If a corresponding host target is not found in this table, the dispatcher will exit and request that the cross compiler generate host code for the target, prior to re-attempting a dispatch. This "outer loop" code will first determine whether the guest instruction address falls within a precompiled image or a hybrid binary. If not, the target is submitted to the runtime cross compiler. To ensure process control flow security is preserved, the guest target address will validate against the guest CFG bitmap prior to invoking the core dispatcher (which may subsequently attempt to generate native code corresponding to the guest address).

If the target falls within a hybrid module, the following algorithm is employed:
  A) Search the host remap list for a matching instruction address. If found, use the corresponding guest callable target as the "compiled" code address.
  B) If a match is not found, one of two possibilities exist:
    1) The address falls into the guest object code range. If so, the guest instruction address may be treated equivalent to application level code.
    2) Otherwise, the address falls into the native code section. In this case, a 1:1 translation may be used (this case will be encountered when translated code "returns" to the interoperability push thunk, for example).

If the target falls within a module associated with a persistent cache file, the following step is taken:
  A) Metadata associated with the cache file is consulted to determine whether the guest RVA falls within the generated cache file. If so, the appropriate translation entry is added to the dispatcher hash table (with both the guest and host addresses adjusted to reflect the current effective mapped address). Since hybrid modules may contain guest object code, it is possible that a persistent cache file would be associated with hybrid modules as well.

If the target falls within neither a hybrid module nor a module paired with a persistent cache file, the target address is submitted to the cross compiler, the generated code is added to the code cache (private and/or persistent), and the dispatcher hash table updated accordingly. It is important to note that in the first two cases (hybrid module or persistent file), it is possible to implement a "cluster fault", whereby many nearby guest to host translation entries are bulk added to the dispatcher's hash table, eliminating the need for future dispatcher exits.

Native Host Remap List

Since function addresses exposed outside a module (via exports, escaped types, or the like) are native host callable targets, a native host remap list is used by the emulator 114 to dynamically redirect native host callable targets to the appropriate interoperability stub. This mechanism allows hybrid native host code binding (statically or dynamically) to other native host hybrid code to achieve nearly native performance, while incurring a slight penalty for invocations arising from emulated code.

A remap list entry may take one of two forms:
  1) For true hybrid code, the remap entry redirects a guest invocation to the corresponding interoperability pop thunk.
  2) For guest code, the native host callable target is an interoperability push thunk, but the remap entry points to the emulator dispatch assist within the thunk. In particular:

```
__int64 foo(int i, int j, int k) [__cdecl]
 _foo:                              // standard x86 name
  push   {r0,r1,r2}                 // push arguments and save return [1]
  mov    r7, lr                     //
  add    r0, pc,0x10                //
  push   {r0}                       //
  movw   r3, foo__wow32__x86        // x86 version (linker fix up) [2]
```

```
    movt    r3, foo__wow32__x86          //
    b       __os__emulator32__dispatch   // Invoke emulator
    ...                                  // [3]
```

In the above example, the remap entry for the interoperability thunk address [1] is [2]. Thus, a typical remap entry may be typed as follows:

```
struct _HYBRID_REMAP_ENTRY {
    union {
        ULONG Native hostRva;       // Assume minimum two
    byte alignment
        ULONG PopThunkEntry : 1;
    };
    union {
        struct {
            ULONG PopThunkRva;
            ULONG GuestEntryProlog;  // Compatibility
            thunk
        };
        struct {
            USHORT AssistRvaOffset;
            USHORT Pad;
            ULONG GuestCodeRva;      // Guest code
address
        };
    };
};
```

The remap list itself is an array sorted in ascending order by Native hostRva. It is also worth noting that, in the case of a push thunk entry, each of the values Native hostRva and Native hostRva+AssistRvaOffset has a linear address that precedes the next Native hostRva in the remap list.

Exception Handling

To achieve the interop EH behavior described above, the compiler and toolset provides the following accommodations:

Hybrid host code functions (including pop thunks) use the full (rather than compact) format of xdata and a flag indicates that the emulator64 stack pointer is x28, not x31.

Hybrid host code functions are registered with the native exception dispatcher/handler. To differentiate from guest dispatcher in hybrid images, some CRT EH helpers are renamed and the toolset generates references to them, rather than the x86 or native helper.

The pop thunk is equipped with regular .pdata and .xdata which registers the special _os_emulator64_native_handler as the handler. The only unwind code needed is stack allocation on emulation stack annotated by the regular unwind code for alloc_s.

Hybrid host code functions with indirect or push thunk calls register an EH record annotated with a special_os_emulator64_handler which is chained by x26 (FS base) in its stack just as X86 code does. Note that an EH/SEH table is not required for this EH record.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
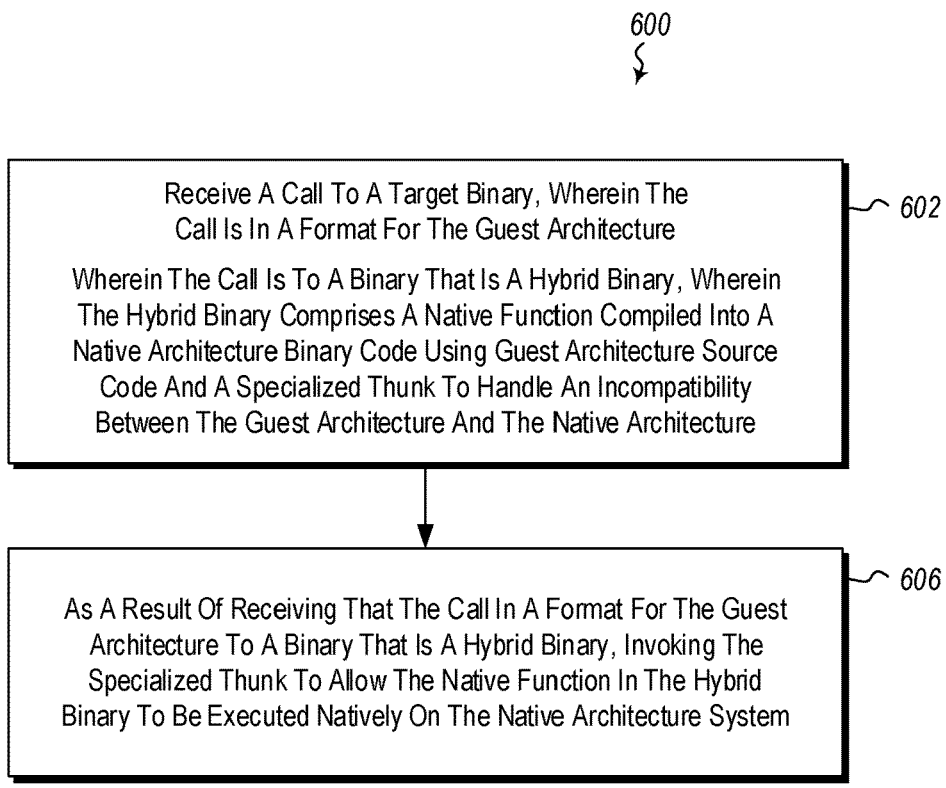
FIG. 6 illustrates a method of handling function calls.

Referring now to FIG. 6, a method 600 is illustrated. The method 600 may be practiced in a computing environment with a guest architecture running a native architecture system. The method includes acts for handling function calls. The method includes receiving a call to a target binary, wherein the call is in a format for the guest architecture (act 602). The call is to a binary that is a hybrid binary, wherein the hybrid binary includes a native function compiled into a native architecture binary code using guest architecture source code and a specialized thunk to handle an incompatibility between the guest architecture and the native architecture.

The method 600 further includes, as a result of determining that the call in a format for the guest architecture to a binary that is a hybrid binary, invoking the specialized thunk to allow the native function in the hybrid binary to be executed natively on the native architecture system (act 606).

The method 600 may be practiced where receiving a call to a target binary comprises receiving a call from an x86 function.

The method 600 may be practiced where the native function comprises an ARM architecture function.

The method 600 may be practiced where invoking the specialized thunk causes a data to be passed to the native function placed on a stack by the call in the format for the guest architecture to be popped off the stack into native hardware registers.

The method 600 may further include calling another native function directly from the native function in hybrid binary by calling to another hybrid binary having a native function.

The method 600 may further include calling another native function directly from the native function in the hybrid binary by calling to a native binary.

The method 600 may be practiced where the hybrid binary comprises a second specialized thunk configured to return processing from native functions to an emulator configured to at least one of (and potentially all of): interpret, cross compile, or cross compile and cache guest functions to run the guest functions on the native architecture system. In some such embodiments, the method further includes calling to a guest function from the native function in the hybrid binary, and as a result invoking the second specialized thunk causing the guest function to be executed by the emulator.

The method 600 may be practiced where the hybrid binary comprises a second specialized thunk configured to return processing from native functions to an emulator configured to cross compile guest functions to run the guest functions on the native architecture system. In some such embodiments, the method may further includes using an indirect call to call to another function from the native function in the hybrid binary; determining that the indirect call is to a function that is not identified as a native function; and as a result invoking the second specialized thunk causing the another function to be handled by the emulator. In some such embodiments, determining that the indirect call is to a function that is not identified as a native function comprises referencing a data structure that indexes native functions.

Figure 7:
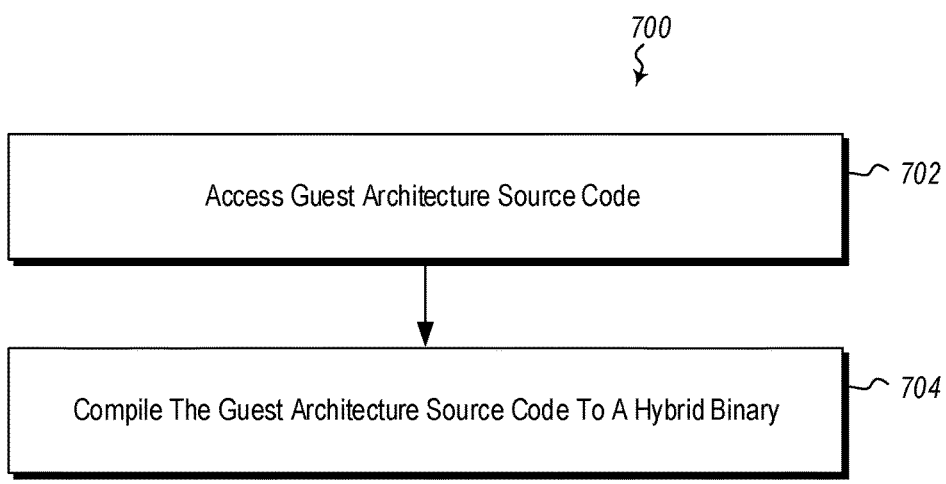
FIG. 7 illustrates a method of creating a hybrid binary using guest source code for a guest architecture running on a native architecture system.

Referring now to FIG. 7, a method 700 is illustrated. The method 700 may be practiced in a computing environment. The method includes acts for creating a binary using guest source code for a guest architecture running on a native architecture system. The binary is configured to run natively on the native architecture system. The method includes accessing guest architecture source code (act 702).

The method 700 further includes compiling the guest architecture source code to a hybrid binary (act 704). This includes creating a native function compiled into a native architecture binary code using guest architecture source code. This further includes creating a specialized thunk to handle an incompatibility between the guest architecture and the native architecture. For example, in some embodiments, the native architecture may be ARM and the guest architecture may be x86. The specialized thunk may be configured to cause a call to the native function (i.e., a native ARM function created using x86 source code) to be placed on a stack by the call in the format for the guest architecture (i.e., an x86 call) to be popped off the stack into native hardware registers (prior to invoking the native routine). Some code in a hybrid binary may remain as guest code. Embodiments can deal with this by treating such hybrid binaries like any other guest code.

The method 700 may be further practiced where compiling the guest source code to a hybrid binary includes creating a second specialized thunk configured to return processing from native functions to an emulator configured to cross compile guest functions to run the guest functions on the native architecture system.

The method 700 may be further practiced where compiling the guest source code to a hybrid binary includes creating metadata identifying the hybrid binary as a hybrid binary.

The method 700 may further include identifying native functions in a data structure. For example, the data structure may be a bitmap, such as data structure to realize the "Guard" feature implemented in Windows 8.1 Update 3 and later available from Microsoft Corporation of Redmond Wash.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computer system that includes at least one processor, for handling native and guest function calls within an environment with a guest architecture running within a native architecture system, the method comprising:
   receiving a call to a hybrid binary, wherein the call uses a function calling format having an incompatibility with the native architecture system, and wherein the hybrid binary comprises:
      a native function compiled into native binary code that is natively executable on the native architecture, the native binary code being generated from source code based on using one or more preprocessor defines associated with targeting the guest architecture;
      an interoperability thunk comprising code that is executable by the native architecture and that is configured to handle at least one incompatibility between how the guest architecture and the native architecture pass data between functions, the interoperability thunk comprising at least one of (i) an interoperability pop thunk comprising code that is executable by the native architecture and that is configured to pop data off a stack and into a register, or (ii) an interoperability push thunk comprising code that is executable by the native architecture and that is configured to push data onto the stack; and
      native host remapping metadata that is usable by an emulator to redirect native host callable targets to the interoperability thunk; and
   as a result of receiving the call, invoking the interoperability thunk to handle the incompatibility with the native architecture system, enabling the call to invoke the native function within the hybrid binary in order to natively execute the native binary code on the native architecture system.

2. The method of claim 1, wherein the interoperability thunk comprises the interoperability pop thunk.

3. The method of claim 1, wherein the interoperability thunk comprises the interoperability push thunk.

4. The method of claim 1, wherein the native host remapping metadata comprises an array of remap entries.

5. The method of claim 1, wherein the hybrid binary also comprises configuration data that identifies function targets that are written in native code.

6. The method of claim 5, wherein the configuration data comprises a bitmap.

7. The method of claim 6, wherein state of a bit in the bitmap indicates either,
   that a target corresponding to the bit is native code; or
   that the target is guest code or is an invalid target.

8. A computer system comprising:
   at least one processor; and
   at least one computer-readable media having stored thereon computer-executable instructions that are executable by the at least one processor to cause the computer system to handle native and guest function calls within an environment with a guest architecture running within a native architecture system, the computer-executable instructions including instructions that are executable by the at least one processor to perform at least:
      receive a call to a hybrid binary, wherein the call uses a function calling format having an incompatibility with the native architecture system, and wherein the hybrid binary comprises:
         a native function compiled into native binary code that is natively executable on the native architecture, the native binary code being generated from source code based on using one or more preprocessor defines associated with targeting the guest architecture;
         an interoperability thunk comprising code that is executable by the native architecture and that is configured to handle at least one incompatibility between how the guest architecture and the native architecture pass data between functions, the interoperability thunk comprising at least one of (i) an interoperability pop thunk comprising code that is executable by the native architecture and that is configured to pop data off a stack and into a register, or (ii) an interoperability push thunk comprising code that is executable by the native architecture and that is configured to push data onto the stack; and
         native host remapping metadata that is usable by an emulator to redirect native host callable targets to the interoperability thunk; and
      as a result of receiving the call, invoke the interoperability thunk to handle the incompatibility with the native architecture system, enabling the call to invoke the native function within the hybrid binary in order to natively execute the native binary code on the native architecture system.

9. The computer system of claim 8, wherein the interoperability thunk comprises the interoperability pop thunk.

10. The computer system of claim 8, wherein the interoperability thunk comprises the interoperability push thunk.

11. The computer system of claim 8, wherein the native host remapping metadata comprises an array of remap entries.

12. The computer system of claim 8, wherein the hybrid binary also comprises configuration data that identifies function targets that are written in native code.

13. The computer system of claim 12, wherein the configuration data comprises a bitmap.

14. The computer system of claim 13, wherein state of a bit in the bitmap indicates either,
   that a target corresponding to the bit is native code; or
   that the target is guest code or is an invalid target.

15. A computer program product comprising at least one hardware storage device having stored thereon computer-executable instructions that are executable by at least one processor to cause a computer system to handle native and guest function calls within an environment with a guest architecture running within a native architecture system, the computer-executable instructions including instructions that are executable by the at least one processor to perform at least:
   receive a call to a hybrid binary, wherein the call uses a function calling format having an incompatibility with the native architecture system, and wherein the hybrid binary comprises:

a native function compiled into native binary code that is natively executable on the native architecture, the native binary code being generated from source code based on using one or more preprocessor defines associated with targeting the guest architecture;

an interoperability thunk comprising code that is executable by the native architecture and that is configured to handle at least one incompatibility between how the guest architecture and the native architecture pass data between functions, the interoperability thunk comprising at least one of (i) an interoperability pop thunk comprising code that is executable by the native architecture and that is configured to pop data off a stack and into a register, or (ii) an interoperability push thunk comprising code that is executable by the native architecture and that is configured to push data onto the stack; and native host remapping metadata that is usable by an emulator to redirect native host callable targets to the interoperability thunk; and as a result of receiving the call, invoke the interoperability thunk to handle the incompatibility with the native architecture system, enabling the call to invoke the native function within the hybrid binary in order to natively execute the native binary code on the native architecture system.

16. The computer system of claim 15, wherein the interoperability thunk comprises the interoperability pop thunk.

17. The computer system of claim 15, wherein the interoperability thunk comprises the interoperability push thunk.

18. The computer system of claim 15, wherein the native host remapping metadata comprises an array of remap entries.

19. The computer system of claim 15, wherein the hybrid binary also comprises configuration data that identifies function targets that are written in native code.

20. The computer system of claim 19, wherein the configuration data comprises a bitmap.

\* \* \* \* \*